FREQUENCY SYNCHRONIZING SYSTEM FOR A SWEPT FREQUENCY OSCILLATOR

Filed July 20, 1966

INVENTOR

HERBERT KÖHLER

BY [signature]

ATTORNEY

United States Patent Office 3,391,348

Patented July 2, 1968

3,391,348

FREQUENCY SYNCHRONIZING SYSTEM FOR A SWEPT FREQUENCY OSCILLATOR

Herbert Köhler, Vogesenallee, Germany, assignor to International Standard Electric Corporation, New York, N.Y., a corporation of Delaware Filed July 20, 1966, Ser. No. 566,638
Claims priority, application Germany, Aug. 5, 1965, St 24,230; Aug. 14, 1965, St 24,271
10 Claims. (Cl. 331—4)

ABSTRACT OF THE DISCLOSURE

A reference signal having a given frequency is amplitude modulated by a swept frequency oscillatory signal. The modulated signal is rectified to produce a control signal including therein a constant amplitude pulse every time the frequency of the oscillatory signal is equal to a multiple of the given frequency. A counter counts the pulses of the control signal and produces an output at a selected one of the pulses. The control signal may be coupled directly to the swept frequency oscillator, or through an AND gate enabled by the output of the counter to synchronize the frequency of the oscillatory signal to the selected multiple of the given frequency.

This invention relates to a synchronizing system and more particularly to a synchronizing system for a swept frequency oscillator to provide a spectrum of frequencies each of which are synchronized to a multiple of a reference frequency.

There are many instances where it is desired to provide a spectrum of different frequencies within a given range to be utilized in the comparison of received signals, analysis of a frequency received and in multiple heterodyne operating devices such as heterodyne receivers.

It has been known in the past that such a spectrum of frequencies can be obtained by utilizing a spectrum frequency generator the outputs of which are mixed in separate mixer devices with signals being received. By this mixing process and subsequent filtering with the aid of narrow bandpass filters a frequency of constant value can be obtained which is compared with a reference signal having this constant frequency. The comparison will produce a control signal to adjust the frequencies of the spectrum to assure synchronization of these frequencies with the reference frequency. When a signal passes through each narrow bandpass filter during tuning through the frequency spectrum a pulse is produced which is registered by a counting device. Subsequent to the passage of the desired number of pulses a frequency and/or phase discriminator is employed to produce a control signal which may be applied to a capacitance diode (voltage variable capacitor) to establish the desired synchronization. This method requires a relatively high expenditure in circuit elements such as filters, mixers, bandpass filters, spectrum frequency generator and the like. Moreover, there also exists the danger that faulty synchronizing points will arise which, under certain circumstances, may render the method unreliable to such an extent that it will only become conditionally suitable for use.

An object of this invention is to provide a relatively simple arrangement to synchronize the various frequencies of a frequency spectrum in a given frequency range which are appropriately synchronized to a single reference signal.

A feature of this invention is the provision of a frequency synchronizing system for a swept frequency oscillator comprising a source of reference signal having a given relatively low frequency, a swept frequency oscillator means generating an oscillatory signal which is swept through a relatively high frequency range including a plurality of multiples of said given frequency, which multiples constitute the frequencies of the frequency spectrum, first means coupled to said source and said oscillator means to amplitude modulate said reference signal with said oscillator signal, second means coupled to said first means to produce a control signal including an indication of when the frequency of said oscillatory signal is equal to a multiple of said given frequency, and third means to couple said control signal from said second means to said oscillator means to synchronize the frequency.

The above-mentioned and other features and objects of this invention will become more apparent by reference to the following description taken in conjunction with the accompanying drawings, in which.

Figure 1:
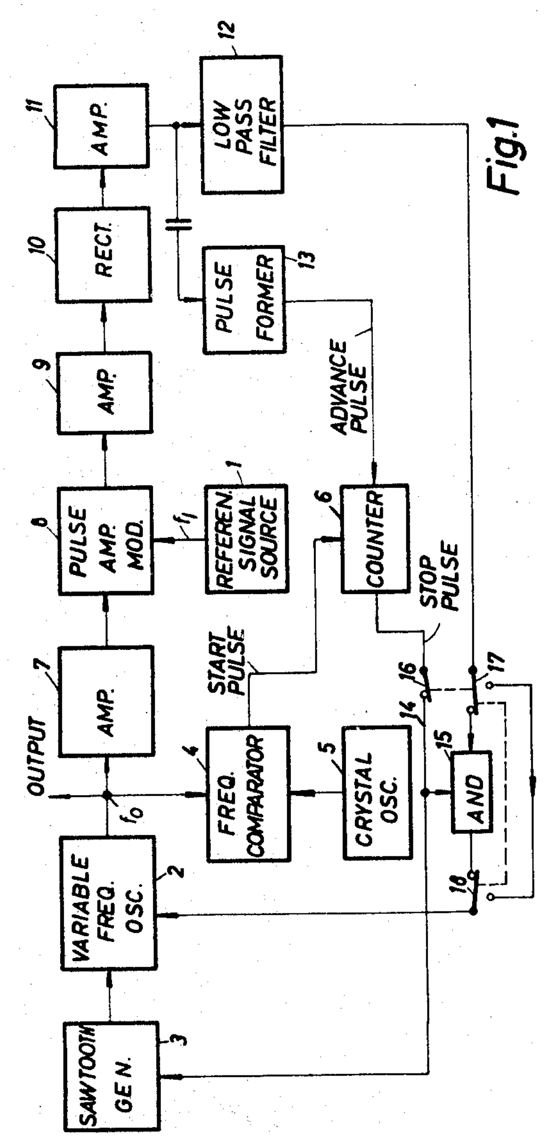
FIG. 1 is a block diagram of the frequency synchronizing system in accordance with the principles of this invention.

Referring to FIG. 1, the frequency synchronizing system of this invention includes a source 1 of reference signal having a given relatively low frequency in the form of pulses with a repetition frequency $f_1$ corresponding to the frequency spacing between the frequencies of the spectrum to be provided by a variable frequency oscillator 2 which is swept through a given frequency range by a saw tooth generator 3 wherein said range includes a plurality of multiples of the repetition frequency of the reference signal. It should be pointed out at this point that for the operation of this inventive system the duration of the pulses from source 1 should not be greater than one quarter of the oscillation period of the highest oscillation frequency from oscillator 2. If this duration requirement is not maintained the possibility of amplitude modulation required, as described below, become less possible to achieve until no amplitude modulation can be obtained.

The swept frequency output of oscillator 2 is coupled to a frequency comparator 4 which employs as a reference signal the frequency output of a crystal oscillator 5 having the value of this frequency arranged to equal the first multiple of the reference frequency $f_1$ within the frequency range through which oscillator 2 is swept. When the frequency of oscillator 2 exceeds the frequency of oscillator 5, the frequency comparator 4 produces an output pulse to start the operation of counter 6.

The output of oscillator 2 is also coupled through an amplifier 7 to a pulse amplitude modulator 8 wherein the reference signal is amplitude modulated by the oscillatory signal of oscillator 2 which produces in the case of $f_0=nf_1$, a constant amplitude varying at zero frequency and, in the case of $f_0\neq nf_1$, varying amplitudes having frequencies lying between 0 and $f_{1/2}$. The resultant amplitude modulated output of modulator 8 is amplified in amplifier 9, rectified in rectifier 10 and the resultant DC signal, or slowly varying DC signal, may be further amplified, if necessary, in amplifier 11 whose output is coupled to low pass filter 12 to provide a control signal to establish the desired synchronization when $f_0=nf_1$.

As will be recognized, it is normal for a lower frequency to amplitude modulate a higher frequency but in the present system the higher frequency amplitude modulates the lower frequency in modulator 8. This is accomplished in the following manner. If the oscillator frequency $f_0$ is equal to a multiple of the pulse repetition frequency $f_1$, then the amplitude of the pulse is added to the instantaneous amplitude of the oscillatory signal with the same phase relation resulting in a sum of the amplitudes of both the pulses and the oscillatory signal being constant in the case of $nf_1=f_0$. However, if $nf_1 \neq f_0$, then the sum values resulting from the addition of the pulse amplitude and the instantaneous amplitude of the oscillatory signal are changed, since the pulse amplitudes are no longer being added in the same phase relation to the amplitudes of the oscillatory signal. In the case of known synchronization, therefore, the pulse whose duration is no greater than one quarter of the oscillation period of the oscillatory signal will be amplitude modulated in modulator 8 by $f_{mod}$. In the maximum, $$f_{mod}=f_{1/2}$$

while, in the case of synchronization between $f_0$ and a multiple of $f_1$, $f_{mod}$ will become equal to zero.

Depending upon the phase relationship between the reference signal (the pulse of repetition frequency $f_1$) and the oscillatory signal, the resultant amplitude modulated pulse may have an amplitude extending from $U_{min}$ to $U_{max}$. Whether the constant amplitude pulses, in the case of $f_0=nf_1$, has an amplitude equal to $U_{max}$, or some amplitude between $U_{min}$ to $U_{max}$, will depend strictly upon the phase relationship between oscillatory signals and the reference pulse signal. The resultant output of modulator 8 having the above amplitude and frequency characteristics will be operated upon by the components connected thereto to obtain a control voltage for establishing synchronization between all of or any selected one of the oscillatory signals having a frequency which is a multiple of the reference frequency at the output of oscillator 1.

As pointed out hereinabove the output of modulator 8 is amplified by amplifier 9 and rectified by rectifier 10 to produce a direct current voltage related to the amplitude and frequency conditions at the output of modulator 8 which are indicative of synchronization between $f_0$ and a multiple of $f_1$, or nonsynchronization between these signals. If the DC voltage at the output of rectifier 10 needs to be increased for control of a voltage variable capacitor, in the form of a capacitance diode associated with oscillator 2, this necessary increase in amplitude is provided by amplifier 11.

The output of amplifier 11 (or rectifier 10 if amplifier 11 is omitted) is coupled to a pulse former 13 which responds to each case of synchronization, that is, each time $f_0=nf_1$ which is utilized as an advance pulse for counter 6 to advance the count thereof until the selected frequency, a multiple of $f_1$, is present in the output of oscillator 2. At this time counter 6 produces a stop pulse which is transmitted along conductor 14 to sawtooth generator 3 to cause this generator to stop its sweep and maintain the frequency achieved by the oscillatory signal at the output of oscillator 2. At the same time this stop pulse is coupled to AND circuit 15 to permit passage of the control voltage from filter 12 to oscillator 2 so that the desired synchronization is accomplished and maintained.

Another arrangement of the system of FIG. 1 is possible and results in not interrupting the control voltage during the sweeping of oscillator 2 by generator 3. This alternative can be achieved by opening switch 16 and placing switches 17 and 18 in their alternative position. Switch 16 breaks the connection for the stop pulse from counter 6 and switches 17 and 18 bypass the control voltage about the AND gate 15.

With this set up there is required that the control voltage and oscillator 2 cooperate to have a relatively extensive hold range about a multiple of the reference signal. By the term "hold range" reference is made to that range where synchronism is maintained by the control voltage even though the frequency being synchronized is being shifted by another signal. Thus, when the constant amplitude, zero frequency indication is present in the control voltage from filter 12 for one multiple of $f_1$, the oscillator 2 is locked to this multiple and provides an oscillatory signal equal to the multiple. This frequency of oscillatory signal will be maintained by the control voltage even though the sawtooth generator 3 continues its sweep. When the hold range of this particular multiple of $f_1$ is exceeding, the oscillatory signal will jump in frequency to that value dictated by the sawtooth generator 3 and may jump to the hold range of the next multiple of $f_1$, or soon will be swept into this hold range wherein again the constant amplitude, zero frequency indication of the control signal will lock the oscillatory signal of oscillator 2 to this multiple of $f_1$.

Figure 2:
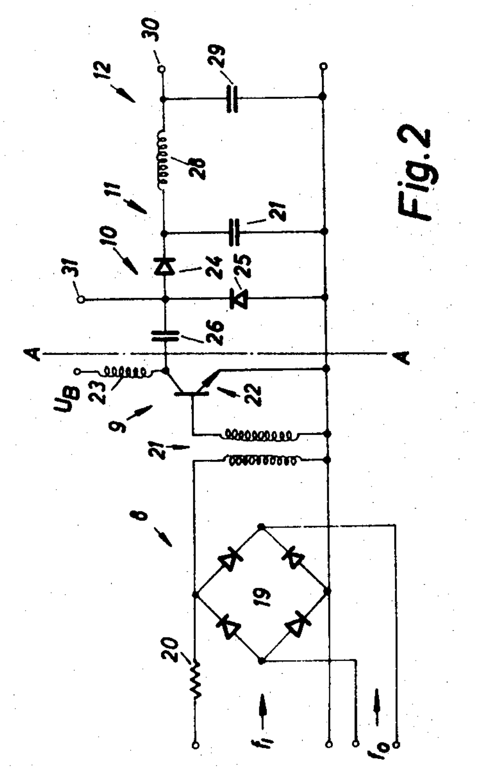
FIG. 2 is a schematic diagram of certain of the blocks of FIG. 1.

Referring to FIG. 2, there is illustrated therein a schematic diagram of modulator 8, amplifier 9, rectifier 10 and amplifier 11 along with filter 12.

Modulator 8 includes a bridge rectifier 19 having the oscillatory signal $f_0$ coupled to one pair of opposite terminals of rectifier 19. The reference pulse signal from source 1 is coupled through resistor 20 to be applied across the other pair of opposite terminals of rectifier 19. Rectifier 19 represents a resistance which is variable in accordance with the oscillatory signal $f_0$. Thus, the reference pulse signal is confronted by a fixed resistance 20 and a resistance in bridge rectifier 19 which is varied in accordance with the oscillatory signal. The pulse amplitude existing at the primary winding of transformer 21 is constant in the case of synchronization ($nf_1=f_0$), because the reference pulse signals always coincide in phase with the instantaneous value of the amplitude of the oscillatory signal $f_0$ and, consequently, rectifier 19 always has the same resistance value.

However, if a non-synchronization is present ($nf_1 \neq f_0$) the resistance of rectifier 19 will change. Because of this the reference pulse signal $f_1$ will be confronted by a different resistance so that its pulse amplitude is changed accordingly. These pulse amplitude variations which correspond to an amplitude modulation are transmitted by transformer 21 to the base of transistor 22 and serve to control the conduction thereof.

The series circuit composed of resistor 20 and rectifier 19 represents a voltage divider with one resistance thereof, the resistance of rectifier 19, being dependent upon the instantaneous voltage and polarity of the applied oscillatory signal $f_0$. Accordingly, the reference pulses $f_1$ are subjected to an amplitude modulation with the modulating frequency lying between $$f_{mod}=0 \text{ and } f_{mod}=f_{1/2}$$

The pulse amplitude modulated signal applied to the base of transistor 22 causes conduction thereof with more or less current dependent upon the pulse amplitude, or energy content of the pulse, which permits more or less current to flow through reactance coil 23. Upon termination of the pulse, transistor 22 becomes highly resistive (nonconduction). The energy stored in coil 23 breaks down in the opposite direction and the voltage increases in a sawtooth manner dependent upon the pulse amplitude, or in other words the energy stored in coil 23. This voltage generated by coil 23 is applied to rectifiers 24 and 25 by means of capacitor 26 with rectifiers 24 and 25 providing peak rectification of the voltage produced by coil 23 and simultaneously a voltage doubling in conjunction with capacitor 27. The low pass filter 12 including inductance 28 and capacitor 29 provides at terminal 30 the desired synchronizing control voltage.

There is also present in this circuit arrangement a terminal 31 which enables the coupling of the AC voltage applied to rectifiers 24 and 25 to pulse former 13 which operates as previously mentioned to produce the advance pulse for counter 6.

Figure 3:
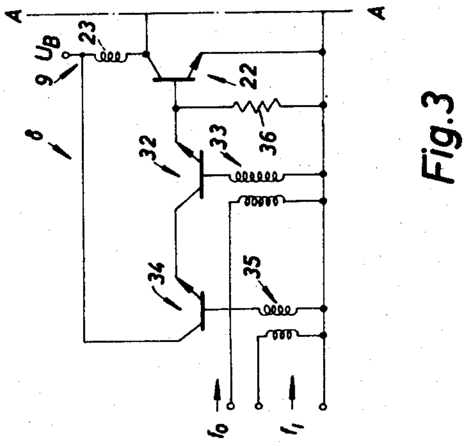
FIG. 3 is a schematic diagram to be substituted for the components to the left of line A—A of FIG. 2 illustrating a second embodiment of the pulse amplitude modulator of FIG. 2.

Referring to FIG. 3, there is illustrated another embodiment of modulator 8 which may be substituted for the components in FIG. 2 to the left of line A—A. In this alternative arrangement, a first transistor 32 has the oscillatory signal from oscillator 2 coupled to the base thereof by means of transformer 33. A second transistor 34 has its emitter and collector electrodes coupled in series relation with the collector emitter electrodes of transistor 32 and has applied to its base the reference signal from source 1 by means of transformer 35. In series with the series connected transistors 32 and 34 is coupled a resistor 36 which produces thereacross the amplitude modulated pulses as produced by the two signals, the oscillatory signal controlling the conduction of transistor 32 and the reference pulse signal $f_1$ controlling the conduction of transistor 34. The pulse amplitude modulation appearing across resistor 36 has the same indication for synchronization, that is, a constant amplitude, zero frequency characteristic while for non-synchronization the pulse amplitudes vary between zero and $f_{1/2}$ as previously explained. The voltage across resistor 36 is applied to transistor 22 and, hence, controls conduction thereof to produce the operation in coil 23 as described in connection with FIG. 2.

While I have described above the principles of my invention in connection with specific apparatus, it is to be clearly understood that this description is made only by way of example and not as a limitation to the scope of my invention as set forth in the objects thereof and in the accompanying claims.

I claim:

1. A frequency synchronizing system for a swept frequency oscillator comprising:
- a source of reference signal having a given relatively low frequency;
- a swept frequency oscillator means generating an oscillatory signal which is swept through a relatively high frequency range including a plurality of multiples of said given frequency;
- first means coupled to said source and said oscillator means to amplitude modulate said reference signal with said oscillatory signal;
- second means coupled to said first means to produce a control signal including an indication of when the frequency of said oscillatory signal is equal to a multiple of said given frequency; and
- third means to couple said control signal from said second means to said oscillator means to synchronize the frequency of said oscillatory signal to at least one selected one of said plurality of multiples of said given frequency.

2. A system according to claim 1, wherein:
said third means includes:
- fourth means in a normally blocked condition to prevent coupling of said control signal to said oscillator means, said fourth means being unblocked upon occurrence of said indication of said control signal to couple said control signal to said oscillatory means to stop the sweeping of said oscillatory signal and accomplish said synchronization.

3. A system according to claim 1, wherein:
said third means continuously couples said control signal to said oscillator means, said oscillator means and said control signal cooperating to provide said synchronization for a given hold range at one of said multiples of said given frequency, the frequency of said oscillatory signal jumping at least to a frequency adjacent the hold range of the next succeeding one of said multiples of said given frequency when the frequency of said oscillatory signal is swept beyond said hold range.

4. A system according to claim 1, wherein:
said oscillatory means includes:
- a variable frequency oscillator, and
- a sawtooth generator coupled to said oscillator to sweep said oscillatory signal through said frequency range.

5. A system according to claim 4, wherein:
said third means includes:
- a crystal controlled oscillator to generate a second reference signal having a frequency equal to the first multiple of said given frequency in said frequency range;
- a comparison means coupled to said crystal oscillator and said variable frequency oscillator to produce a start pulse when the frequency of the output signal of said variable frequency oscillator exceeds said first multiple;
- a counter means coupled to said comparison means responsive to said start pulse to start the counting operation thereof;
- pulse forming means coupled to said second means to produce a counter advance pulse for each of said indications of said control signal;
- means to couple said counter advance pulses to said counter to advance the count thereof and produce a stop pulse therein upon occurrence of said at least one selected one of said multiples of said given frequency;
- coincidence means coupled between said second means and said variable frequency oscillator to normally block the coupling of said control signal to said variable frequency oscillator;
- means to couple said stop pulse to said sawtooth generator to stop the sweeping of the frequency of said variable frequency oscillator; and
- means to couple said stop pulse to said coincidence means to unblock the same to permit couplings of said control signal to said variable frequency oscillator for said synchronization.

6. A system according to claim 1, wherein:
said indication of said control signal is a constant amplitude, zero frequency voltage.

7. A system according to claim 1, wherein:
said first means includes:
- a crystal controlled oscillator to generate a second reference signal having a frequency equal to the first multiple of said given frequency in said frequency range;
- a comparison means coupled to said crystal oscillator and said oscillator means to produce a start pulse when the frequency of said oscillator means exceeds said first multiple;
- a counter means coupled to said comparison means responsive to said start pulse to start the counting operation thereof;
- pulse forming means coupled to said second means to produce a counter advance pulse for each of said indications of said control signal;
- means to couple said counter advance pulses to said counter to advance the count thereof and produce a stop pulse therein upon occurrence of said at least one selected one of said multiples of said given frequency; and
- means to couple said stop pulse to said oscillator means to stop the frequency sweeping thereof and to couple said control signal to said oscillator means for said synchronization.

8. A system according to claim 7, wherein:
said indication of said control signal is a constant amplitude, zero frequency voltage.

9. A system according to claim 1, wherein:
said first means includes:
- a transformer having its secondary winding coupled to said second means;
- a bridge rectifier having a first pair of opposite terminals coupled in parallel to the primary winding of said transformer;
- a fixed resistor coupling said source of reference signal to one terminal of said first pair of opposite terminals; and means coupling said oscillator means in parallel to a second pair of opposite terminals of said bridge rectifier;

said amplitude modulation appearing across said primary winding.

10. A system according to claim 1, wherein:

said first means includes:

a fixed resistor coupled in shunt relation to said second means;

a first transistor having its collector and emitter electrodes coupled in series relation with said resistor;

a second transistor having its collector and emitter electrodes coupled in series relation with said collector and emitter electrodes of said first transistor;

means coupling said oscillator means to the base electrode of said first transistor to control the conduction thereof by said oscillatory signal; and means coupling said source of reference signal to the base electrode of said second transistor to control the conduction thereof by said reference signal;

said amplitude modulation appearing across said resistor.

References Cited

UNITED STATES PATENTS

| | | | |
|---|---|---|---|
| 2,523,106 | 9/1950 | Fairbairn et al. | 331—40 |
| 2,884,519 | 4/1959 | Masselin | 331—4 |
| 2,891,157 | 6/1959 | Hansel | 331—18 |
| 3,076,151 | 1/1963 | Swanson | 331—4 |
| 3,155,919 | 11/1964 | Baxter et al. | 331—4 |
| 3,259,851 | 7/1966 | Brauer | 331—18 |

JOHN KOMINSKI, *Primary Examiner.*